(12) United States Patent
Maletti

(10) Patent No.: US 8,067,050 B2
(45) Date of Patent: Nov. 29, 2011

(54) PROCESS FOR THE PRODUCTION OF AROMATIC VINEGAR

(75) Inventor: Davide Maletti, Modena (IT)

(73) Assignee: Agricola Duevittorie di Maletti E Regnani S.r.l.

( * ) Notice: Subject to any disclaimer, the term of this patent is extended or adjusted under 35 U.S.C. 154(b) by 0 days.

(21) Appl. No.: 10/467,794

(22) PCT Filed: Feb. 8, 2002

(86) PCT No.: PCT/IB02/00380
§ 371 (c)(1), (2), (4) Date: Feb. 23, 2004

(87) PCT Pub. No.: WO02/066594
PCT Pub. Date: Aug. 29, 2002

(65) Prior Publication Data
US 2004/0131726 A1 Jul. 8, 2004

(30) Foreign Application Priority Data
Feb. 12, 2001 (EP) .................................... 01830089

(51) Int. Cl.
*C12J 1/00* (2006.01)
(52) U.S. Cl. ........................ 426/384; 426/589
(58) Field of Classification Search ................. 426/312, 426/319, 589, 599, 384, 474, 519, 520
See application file for complete search history.

(56) References Cited

U.S. PATENT DOCUMENTS

| | | | | |
|---|---|---|---|---|
| 2,224,059 A | * | 12/1940 | Mostny | 426/17 |
| 3,002,896 A | | 10/1961 | Buck | |
| 3,381,302 A | * | 4/1968 | Reimus et al. | 426/384 |
| 3,952,538 A | * | 4/1976 | Warlick | 62/342 |
| 4,076,844 A | * | 2/1978 | Ebner et al. | 426/17 |
| 4,313,960 A | * | 2/1982 | Campagne | 426/17 |
| 4,364,960 A | * | 12/1982 | Kunimatsu et al. | 426/17 |
| 5,137,739 A | * | 8/1992 | Roodenrijs | 426/384 |
| 5,565,233 A | * | 10/1996 | Alessi | 426/650 |
| 2002/0081364 A1 | * | 6/2002 | Contini et al. | 426/589 |

FOREIGN PATENT DOCUMENTS

| | | |
|---|---|---|
| CH | 511567 A | 8/1971 |
| DE | 2657330 A | 6/1977 |
| GB | 1371027 A | 10/1974 |
| SU | 863635 A | 9/1981 |

OTHER PUBLICATIONS

Bernardin. Bernardin Guide to Home Preserving, 1996. http://www.autumnjade.com/recipes/74.htm.*

(Continued)

*Primary Examiner* — Kelly Bekker
(74) *Attorney, Agent, or Firm* — Hess Patent Law Firm PC; Robert J. Hess

(57) ABSTRACT

An aromatic vinegar is produced from wine or fruit vinegar and cooked or concentrated musts, by freeze concentrating the vinegar in a freeze concentration system (1) and mixing it together with concentrated must to obtain an aromatic vinegar with an acidity of at least 6 g/100 ml and high sugar content without the addition of additives.

11 Claims, 2 Drawing Sheets

OTHER PUBLICATIONS

Lea, Andrew. The Science of Cidermaking: Part 6—Apple Juice and Cider Vinegar. 1997. http://ourworld.compuserve.com/homepages/andrew_lea/part6.htm pp. 1-4.*

American Culinary Gardens, Sweetened Balsamic Vinegar 1998, www.acgardens.com/products/swt-vin.html, p. 1.*

Lidia Matticchio Bastianich, Strawberry Sundae, Bonnie Churchill, p. 1.*

Lidia Matticchio Bastianich, Strawberry Sundae, Bonnie Churchill, p. 1. 1999.*

Bernardin. Bernardin Guide to Home Preserving, 1996. http://www.autumnjade.com/recipes/74/htm. p. 1.*

Ditchev, S.; Bambalov, G.; Dantchev M.: "Cryoconcentration of liquid food products. Wine vinegar cryoconcentration" Bulletin De L'Institut Internation Du Froid vol. 26, No. 4, 1979, p. 1192.

Database WPI Section Ch, Week 198230 Derwent Publications Ltd., London, GB; AN 1982-62936E, p. 1.

Turtura, G. C.; Benfenati, L.: "Caratteristiche microbiologiche e chiniche dell' aceto balsamico naturale. I. Studio del prodotto" Ann. Microbiol., vol. 38, No. 51, 1988 pp. 51-73.

* cited by examiner

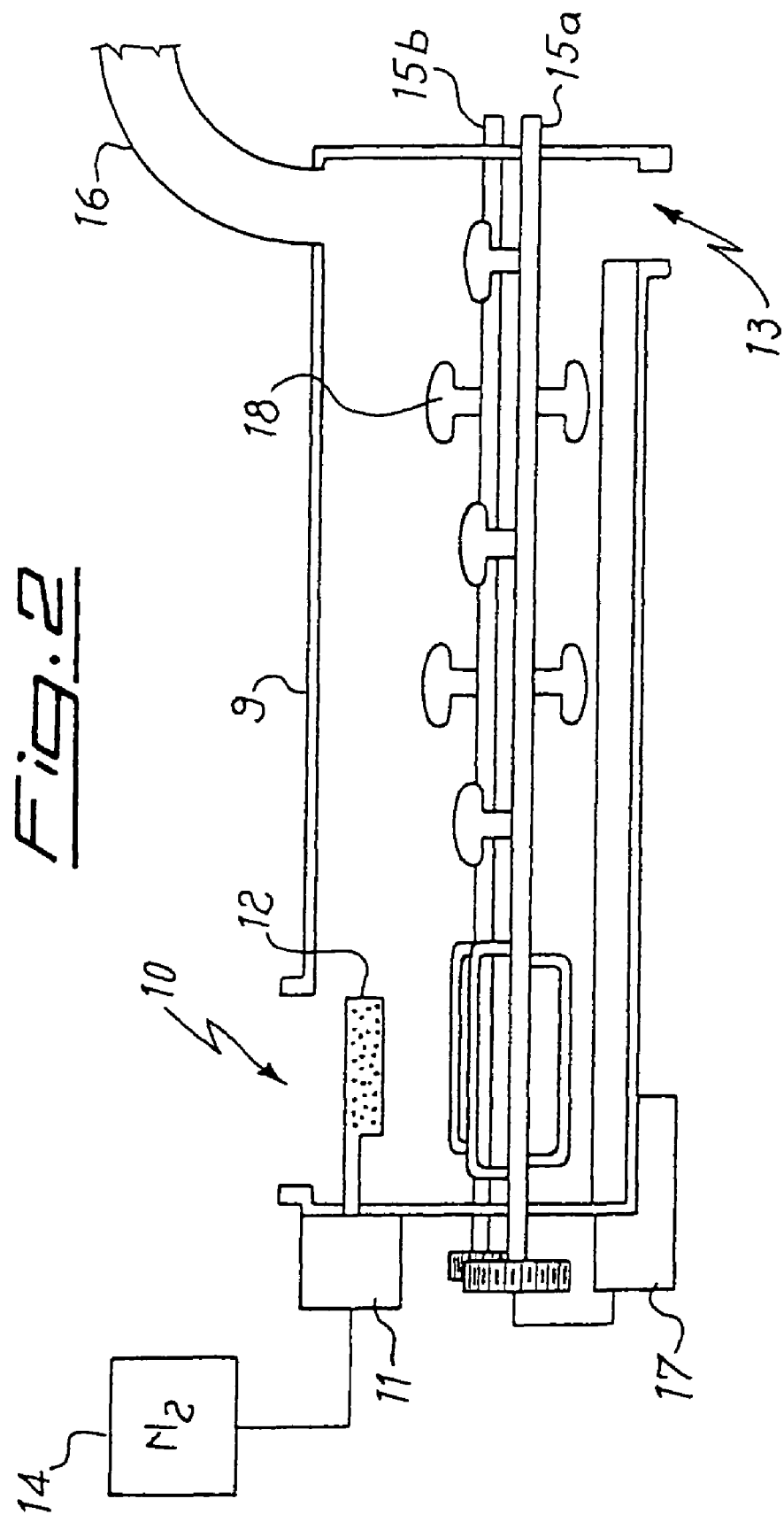

PROCESS FOR THE PRODUCTION OF AROMATIC VINEGAR

FIELD OF THE INVENTION

The present invention relates to a process for producing aromatic vinegar and the vinegar thus produced. In particular, the invention relates to a wine vinegar containing particular compounds able to give an aromatic organoleptic component.

BACKGROUND OF THE INVENTION

In a known process to increase the aroma of vinegar, this is aged in wooden casks of oak, chestnut, juniper and similar to enhance the vinegar with the aroma that can be extracted naturally from the wood. Prolonged ageing is required to obtain appreciable aromas and this process is thus lengthy and costly and, owing to the high final cost of the product, can only be used for limited productions.

Aromatic vinegars obtained by using "cooked" or concentrated musts of grapes are known. These vinegars are known as "balsamic vinegar of Modena" and "traditional balsamic vinegar of Modena" and are essentially produced in the area of the Italian provinces of Modena and Reggio Emilia.

Traditional balsamic vinegar is produced by almost simultaneous alcoholic and acetic fermentation of grape musts previously cooked and concentrated over a direct flame. The musts are inoculated with yeasts, for alcoholic fermentation, and with bacteria, for acetic fermentation, and let to ferment in wooden containers until reaching the maximum degree of acidity obtainable from bacteria and yeasts. The steps of development and aging will then continue for at least 12 years; the steps require partial transferring of the product from one container to the other, with the dimensions of the containers decreasing as the product being processed ages. This process and the product obtained are particularly costly.

To obtain aromatic vinegars at lower costs processes have been developed in which aromatic compounds are added to a base vinegar; namely compounds able to give an aroma to vinegar; an example of this process is the production of (so-called industrial) balsamic vinegar of Modena in which cooked and concentrated musts are added to the vinegar to provide a product with an acidity (expressed in acetic acid) of at least 6% (grams per 100 ml) and a sugar content generally of at least 100-110 g/l. The quality of the product obtained can be improved by ageing and refining in wooden casks, to increase the concentration of sugars, aromatic compounds and density of the product; the known procedure of adding caramel to the product allows the desired colour to be obtained, but does not to improve the organoleptic properties of the product nor does it increase the content of sugar or aromatic compounds; and it also decreases the acidity of the product to the detriment of taste.

Another problem of this technique is the inevitable decrease in the acidity of the product during ageing or heating; in particular, it was found that an increase in the content of sugar and aromatic compounds corresponds to an acidity decrease from 6% to 4-4.5%. A balsamic vinegar with reduced acidity is less acceptable compared to a vinegar with an acidity of at least 6%.

Fruit aromatic vinegars (namely not wine vinegars) such as for instance apple, raspberry and similar vinegars are known as well. The aromatic component of these vinegars is given substantially by ester type compounds contained in fruits, therefore, in order to upgrade their organoleptic properties, even the aromatic component of these vinegars must be increased and improved.

The aim of the present invention is to solve the problems above mentioned and to provide a low-cost and quick process for the production of aromatic vinegars, especially balsamic or balsamic type vinegars of Modena, capable of providing products with an acidity of at least 6 g/100 ml and a high content of sugar and aromatic compounds, without adding sugar, alcohol or artificial aromas during acetic fermentation or the production process.

This aim is obtained by means of the present invention that relates to a process for the production of aromatic vinegar comprising the steps of mixing vinegar with must and characterised in that said vinegar is subjected to freeze concentration before mixing it with must.

According to a preferred embodiment of the invention, wine vinegar is concentrated and then assembled to, that is to say mixed together with, concentrated grape musts. The product thus obtained may then be used as it is, or submitted to a subsequent slow partial evaporation process while being heated under slow stirring.

According to another aspect of the invention, concentrated vinegar is produced without adding alcohol before, during or after the freeze concentration step.

The product obtained can reach high concentrations of sugars and natural aromatic products (esters and similar) and has exceptional organoleptic properties which can otherwise be obtained only by means of lengthy ageing processes.

Therefore, a further object of the invention is an aromatic vinegar as obtainable through the process described above and in particular an aromatic vinegar of the (industrial) "balsamic of Modena" type with an acidity of at least 6% and a sugar content of at least 400 g/l.

Another object of the invention is a freeze concentrated vinegar with an overall acidity expressed in acetic acid of at least 15% and preferably within the range between 18% and 25% (g/100 ml).

As mentioned, the invention has numerous advantages over the known techniques. In fact, it allows a product with high concentrations of sugar and aromatic compounds to be obtained in a very short time, when with traditional methods these concentrations can only be obtained with prolonged ageing of the product. Therefore, the costs are much lower compared with those of traditional products.

Another advantage lies in the fact that, with the same content of sugar and aromatic compounds as traditional aged products, aromatic vinegar according to the invention has an acidity of at least 6% or more and, therefore, a full and particularly pleasant taste. In particular, by performing freeze concentration of the wine vinegar alone and using concentrated musts available on the market it is possible to produce a vinegar according to the processes currently used to produce (industrial) balsamic vinegar of Modena and to obtain a product with much higher organoleptic characteristics than (industrial) balsamic vinegars of Modena available on the market.

Another advantage lies in the fact that the process is also suitable for the production of aromatic fruit vinegars. Yet another advantage lies in the fact that, thanks to freeze concentration, the contents of acidity and aromatic compounds in the initial vinegar remain essentially intact and, after freeze concentration, it has much greater concentrations of total acidity and aromatic compounds; this fact means that no additives of any type are required during production or fermentation of the initial vinegar.

Another advantage lies in the fact that freeze concentration causes a stabilization of the product due to a strong decantation of the substances that precipitate upon cooling.

SHORT DESCRIPTION OF THE DRAWINGS

The invention shall now be described in greater detail with reference to the following drawings provided as a purely exemplary and non-limiting example, in which:

FIG. 2 is a diagram of another apparatus for concentrating vinegar.

DETAILED DESCRIPTION OF THE INVENTION

Figure 1:
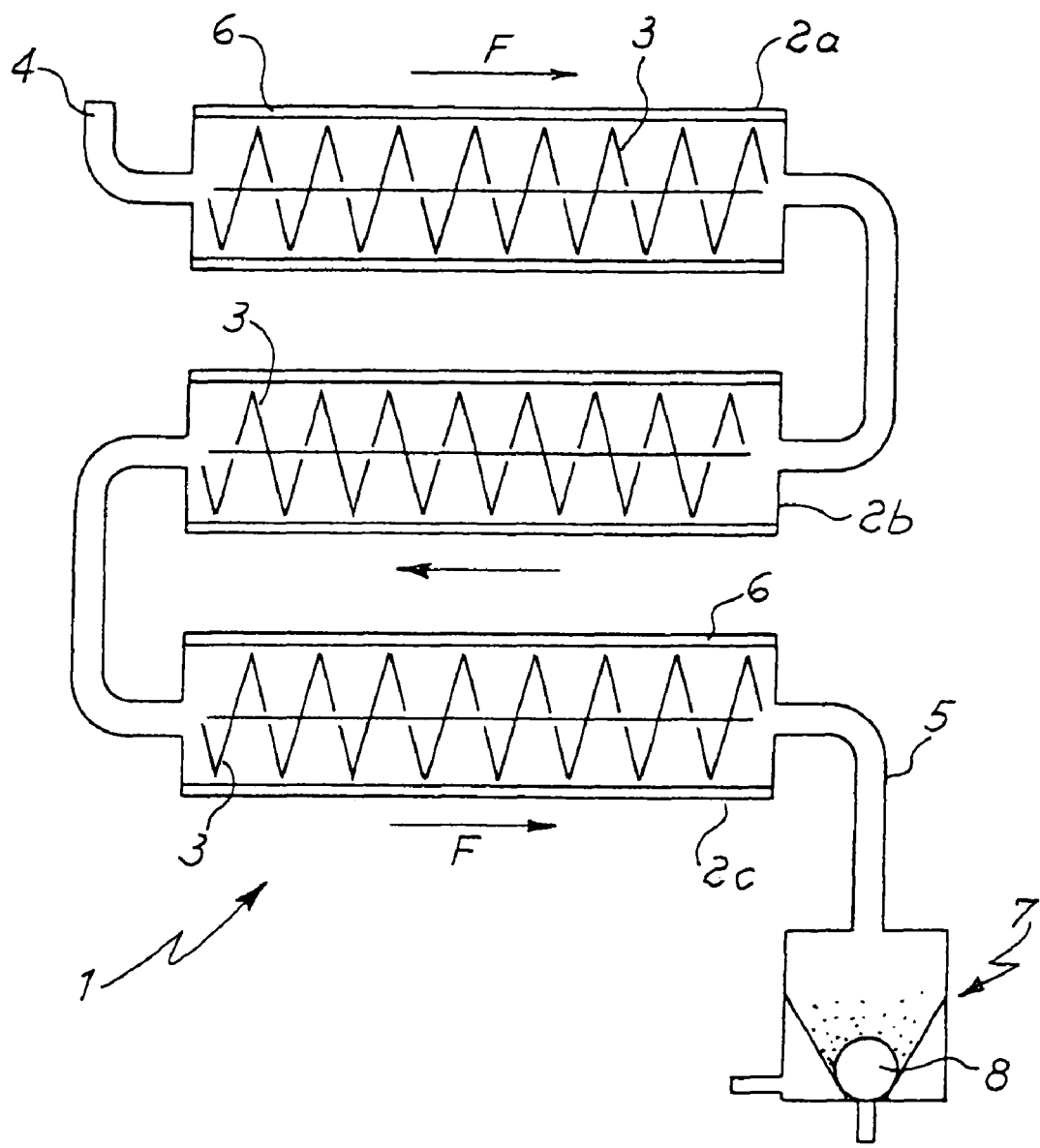
FIG. 1 is a diagram of an apparatus for concentrating vinegar.

As mentioned above, the invention provides to obtain aromatic vinegars, in particular balsamic or balsamic type vinegar of Modena, by mixing freeze concentrated vinegar with cooked must or heat concentrated must. In the following description and in the claims the term "aromatic vinegar" indicates wine or fruit vinegar with added aromatic products composed of cooked musts or extracts from grape or other fruits able to produce musts containing sugar. The term "musts" indicates juices obtained by pressing grapes or other fruit that are essentially not fermented and hence have either no alcohol or an extremely low alcohol content. The term "freeze concentration" indicates the technique that concentrates aqueous-based foods by freezing at least a portion of the aqueous part and separating the ice from the remaining liquid. In the following description the terms "acidity" and "total acidity" indicate the content expressed in acetic acid, grams per 100 milliliters.

This technique is known in the food products processing field, for example from EP-B-0360876 in the name of Societé des Produits Nestlé, which describes in detail a process for freeze concentration in counter current according to which the ice ascends a column and is removed at its top end while the liquid is extracted from the opposite end. The patent mentions the use of this technique to concentrate coffee, milk, fruit juices, wine, beer, vinegar and similar; the only examples indicated refer only to the concentration of coffee.

British patent GB-B-1,101,560 in the name of Heinrich Frings GmbH (published in 1968) and the subsequent U.S. Pat. No. 4,076,844 with the same owner (published in 1978), mention freeze concentration as a known technique for producing concentrated vinegar, but underline how this technique is costly and unfavourable, recommending instead the use of a particular acetic fermentation technique (so-called submersed fermentation) to obtain vinegar with a high degree of acidity. This technique is that presently used by almost all vinegar producers.

Freeze concentration is also mentioned in U.S. Pat. No. 4,313,960 in the name of Campagne, which describes a process for the preparation of vinegar by freeze concentration, stating that the essential condition to obtain an acceptable product is to add ethyl alcohol to the vinegar. Preferably, the vinegar/ethanol mixture is made to pass over ion exchange resins to improve the flavour of the vinegar.

Contrary to the teachings of these patents, it has been found that it is possible to obtain excellent vinegar concentrate without loss of flavour and that the vinegar thus obtained can be used as intermediate in the production of aromatic vinegar with exceptional results.

According to the process of the invention, vinegar is freeze concentrated and mixed with concentrated musts; the latter are preferably grape musts usually cooked or heat concentrated, if needed under low pressure, and available on the market, otherwise musts are freeze concentrated, too. Several subsequent freeze concentration steps of the vinegar are possible. It is preferable to use heat concentrated musts and freeze concentrated vinegar combined together to obtain a total acidity (expressed in acetic acid) of at least 6% (6 g/100 ml). Suitable vinegars are wine vinegar, although it was found that the process can also be carried out with fruit vinegars, for example apple vinegar and similar; wine and fruit vinegar can be combined in various proportions to obtain preferred flavours. In any case, concentrated vinegar is produced without adding alcohol to the vinegar before, during or after the freeze concentration step.

An example of musts suitable and preferable for the invention are commercially available grape musts "cooked" or subjected to heat concentration, such as those marketed by the firms Cantine Riunite of Reggio Emilia and Prati Vini of Albinea (Reggio Emilia). Alternatively, concentrated fruit musts can be used. Moreover, wine vinegar and fruit vinegar can be mixed together, as can grape musts and musts from other fruits, to obtain the aromas required and more or less fruity and more or less sweet vinegars.

The vinegar is freeze concentrated, namely removing part of the water in it so as to approximately double the acidity of the vinegar itself; the ratio between the starting volume of vinegar and the volume of concentrated vinegar to be mixed together with the musts is generally within the range between 1:0.25 and 1:0.7 and preferably between 1:0.3 and 1:0.6. The final concentration corresponds preferably to a total acidity expressed in acetic acid within the range between 18 and 25% (18-25 g/100 ml) and can be reached through a single step, or two or more subsequent freeze concentration steps.

Vinegar is treated at a temperature within the range of −5° C. to 60° C., preferably of −10° C. to −50° C. and more preferably within the range between −15° C. and −25° C. When freezing is carried out using liquid nitrogen or liquid carbon dioxide, the optimal temperature is within the range of −19° C.±2° C. The lower the temperature is, the higher the degree of concentration obtained through a single step is.

As already mentioned, freeze concentration allows to preserve the so called volatile acidity, to the advantage of the organoleptic properties of concentrated vinegar and of the final product after mixing with must.

Freeze concentration of vinegar can be carried out with the vinegar still, in motion or in counter current.

FIG. 1 shows a diagram of a possible concentration apparatus 1 for vinegar and/or musts composed of a series of three heat exchangers 2a-2c of the auger type available on the market. The heat exchangers comprise in a known way a jacket 6 through which is circulated a coolant such as glycol or other liquids used in cooling machines for treating food substances, and an auger 3 to mix and feed liquid in the direction of arrows F. Augers 3 of the heat exchangers are engaged to scrape against the inside walls of exchangers 2 to remove the ice that forms on the walls and carry it from one exchanger to the next and to outlet 5. The outlet pipe 5 has a filter device 7 of the type using a vacuum filter, such as a rotary filter 8, where the ice and residual liquid are separated.

It has been found that the ice contains essentially only water and forms in crystals from which it is extremely easy to separate the concentrated liquid with a very short vacuum suction step. Other known systems for freeze treating food may also be used. A preferred example of such apparatuses is shown in FIG. 2. This apparatus is available from Air Liquide (IT).

FIG. 2 shows a diagram of an apparatus of a type known in the field of production of frozen products, that makes use of a liquefied gas, in this case liquid nitrogen or carbon dioxide, as a cooling source.

The shown apparatus comprises an insulated tank 9 equipped with an inlet 10 for the vinegar to be concentrated and an outlet 13 for the mixture vinegar/ice located on the bottom of the tank on the opposite side with respect to inlet 10. On the upper side, near the inlet 10 for vinegar there is provided a diffuser 12 for the supply of liquid nitrogen into the tank 9. The diffuser 12 is positioned so as to allow the inflowing vinegar to mix with the nitrogen flowing out of the diffuser 12. The diffuser 12 is connected with a reductor 11 and a reservoir 14 containing liquid nitrogen.

The tank 9 contains two augers 15a and 15b, which can rotate one in the opposite direction of the other, for mixing ice and vinegar so as to freeze the mixture uniformly. The blades 18 of the two augers or 15a and 15b graze at least the lower part of the tank and are also positioned so as to bring the mixture ice/vinegar towards the outlet 13; the outlet 13 is connected to a filtering system of the previously described type with reference to FIG. 1, where ice is easily separated from concentrated vinegar. Nitrogen vapours flow out of the pipe 16 located at the upper side of the tank or 9, from the opposite side with respect to inlet 10 for nitrogen. The temperature used in the apparatus shown in FIG. 2 is generally within the range of $-10°$ and $-50°$ C., preferably between $-15°$ C. and $-25°$ C. and even more preferably, it is about $19°\pm2°$ C. The residence time of the product in the tank and the augers rotation speed is chosen so as to ensure an accurate mixing and therefore a homogeneous cooling of the product; the rotation speed of augers is adjusted through a reductor 17.

This apparatus provides the advantage that it allows to produce vinegar continuously and at low costs. In addition, separated vinegar is immediately stored without using manpower. Similar apparatuses using carbon dioxide or liquid air are known.

Cold concentrated vinegar is stored separately and let to decant (without additional cooling) for a period lasting some days (generally from two to six days); during this period the precipitates formed during freeze concentration decant. The analyses carried out revealed that the precipitate is substantially made of the same products that decant when a so called freeze stabilization of the vinegar is performed. This stabilization requires that the vinegar is kept at $0°$ C. for ten days: the process according to the invention, which allows to stabilize by decantation without carrying out another cooling, is therefore clearly advantageous.

The following examples are given as purely exemplary embodiments of the invention.

Example 1

100 liters of wine vinegar with an acidity of 9% (1 g/100 ml) were freeze concentrated. Concentration was performed with the vinegar in still conditions until a layer of ice formed on the walls of the container with liquid accumulating in the centre. After filtering, about 40 liters of concentrated vinegar was obtained. The acidity of the concentrate was 20.5 g/100 ml.

10 liters of concentrated vinegar obtained as above were mixed with 26 liters of unrectified heat concentrated grape must. The sugary residue of the (cooked) concentrated must was 825.6 g/l and its acidity expressed in acetic acid was 1.5%. The final product was a balsamic type vinegar with a total acidity expressed in acetic acid of 6.25% and a sugar content of around 619.2 g/l. The ethanol content was below 1.5% (vol).

When tasted by an expert taster the organoleptic qualities were judged to be excellent.

Example 2

100 liters of apple vinegar with an acidity of 7% g/100 ml were freeze concentrated to obtain about 35 liters of concentrated vinegar with an acidity of 17.2%. 10 liters of concentrated vinegar obtained as above were mixed with 20 liters of concentrated grape must as in example 1. The final product was an aromatic apple vinegar with an acidity of around 6.73%, a high sugar content and excellent organoleptic properties. The ethanol content was below 1.5% (vol.).

Example 3

30 liters of concentrated vinegar obtained as in example 1 were aged in small chestnut casks for 4 months and then mixed with concentrated must as in example 1. The resulting product was full-bodied with excellent aromatisation from the wood.

Example 4

100 liters of wine vinegar with a total acidity expressed in acetic acid of 10% were supplied to a liquid nitrogen freezing apparatus as described in FIG. 2 (available on the market under the name Lecrenier S. A.) and treated at $-19°$ C. with a residence time of the product of about 15 min. The half-frozen mass leaving the tank is filtered and 48 liters of concentrated vinegar with a total acidity of 18.6% are obtained. This concentrated vinegar can then be mixed with a concentrated must as described above in a ratio such as to obtain a balsamic type vinegar with an acidity of about 6-6.5%.

Example 5

800 liters of concentrated must having a residual acidity of 0.8% and residual sugars of 706.7 g/l are mixed with 400 liters of freeze concentrated vinegar having an acidity of 19.5% (expressed in acetic acid g/100 ml) and no residual sugar to obtain 1200 liters of mixing product.

The total acidity of the product obtained (product A) is 6.98%, the residual sugars are 463.4 g/l, and the relative density (i.e. absolute gravity at $20°$ C.) is 1.19.

Product A is then heated at $80°$ C. for 60 hours under slow and constant stirring (3-5 rpm) and evacuation of formed vapours. 100 liters of very high quality balsamic vinegar are obtained, having following characteristics:
total acidity 6.32%
residual sugars 539.9 µl
relative density 1.28.

Losses amount to just about 200 liters divided into about 105 liters of concentrated vinegar, about 23 liters of concentrated must and water for the remaining part. The excellent quality of the final product is probably due to the evaporation of volatile substances which is normally obtained through ageing for a number of years. Evaporation does not change the volatile acidity substantially (losses of acidity are very small), probably because the high concentration of vinegar and must restrain such losses. This result is particularly surprising because, if balsamic vinegar obtained as known (that is from vinegar which is not freeze concentrated and concentrated or cooked must) is submitted to a slow evaporation treatment as the above described one, losses in acidity are much higher and such that the final product has a total acidity always lower than 6%.

It is clear from the above that through the process according to the invention aromatic vinegars, particularly balsamic and balsamic type vinegars with extremely high contents of sugar and aromatic compounds (up to 700 g/l and more of sugar) can be produced, rapidly and without the addition of alcohol or artificial aromas, while maintaining a total acidity of at least 6 g/100 ml. In particular, the product will have a sugar content of at least 400 g/l and it is possible to obtain products with concentrations of at least 450, 500, 550, 600, 650, 700 and over, according to the desired product, depending on the ratio between vinegar and musts and on the total acidity of the concentrated vinegar used for the "assembling" or mixing. As above mentioned, the vinegar can be concentrated in several successive steps until the desired acidity is reached.

The invention claimed is:

1. A process for the production of balsamic vinegar from vinegar and concentrated must, comprising carrying out a production process that includes all the steps of: carrying out freeze concentrating of vinegar that preserves volatile acidity of the vinegar and attains a total acidity expressed in acetic acid of at least 15% (15 g/100 ml) and a total volume of 0.25-0.7 of the original volume of the vinegar by partially freezing an aqueous portion of the vinegar until ice crystals are obtained in a remaining liquid portion of the vinegar; and then separating the ice crystals from the remaining liquid portion of the vinegar so that the remaining liquid portion constitutes concentrated liquid vinegar; and mixing the concentrated liquid vinegar with concentrated must to produce an aromatic, balsamic vinegar that has a total acidity expressed in acetic acid of at least 6% (6 g/100 ml) and a sugar content of at least 400 g/l, without adding sugar, caramel, alcohol, or artificial aromas to the production process.

2. The process according to claim 1, further comprising the step of heating the mixture of concentrated vinegar and concentrated must under stirring in order to concentrate said mixture.

3. The process according to claim 1, wherein said vinegar is wine vinegar and said must is grape must.

4. The process according to claim 1, wherein said freeze concentration step is carried out using liquid nitrogen or carbon dioxide.

5. The process according to claim 3, in which said balsamic vinegar is balsamic vinegar of Modena.

6. The process according to claim 1, further comprising freeze concentrating the must.

7. The process of claim 1, wherein the separating of the ice crystals from the remaining liquid vinegar is through vacuum filtering.

8. The process of claim 1, further comprising aging the concentrated vinegar in wooden barrels before the mixing of the concentrated liquid vinegar with the concentrated must.

9. The process of claim 1, further comprising storing the freeze concentrated vinegar wherein decanting of the freeze concentrated vinegar to separate the ice crystals from the remaining liquid portion of the vinegar occurs during the storing to.

10. A process for production of aromatic vinegar, comprising carrying out a production process including the steps of freeze concentrating vinegar to a total acidity expressed in acetic acid of at least 15% (15 g/100 ml) and a total volume of 0.25-0.7 of the original volume of the vinegar; concentrating must, and mixing the concentrated vinegar with the concentrated must to obtain an aromatic vinegar with an acidity of at least 6% (6 g/100 ml) and a sugar content of at least 400 g/l, the carrying out of the production process taking place without addition of any additives to the production process.

11. A process for production of aromatic vinegar, comprising carrying out a production process that includes all the steps of freeze concentrating vinegar to a total acidity expressed in acetic acid of at least 15% (15 g/100 ml) and a total volume of 0.25-0.7 of the original volume of the vinegar; concentrating must, and mixing the concentrated vinegar with the concentrated must to obtain an aromatic vinegar with an acidity of at least 6% (6 g/100 ml) and a sugar content of at least 400 g/l, the carrying out of the production process taking place without addition of any of sugar, caramel, alcohol, or artificial aromas to the production process.

\* \* \* \* \*